US011652813B2

(12) United States Patent
Patel et al.

(10) Patent No.: US 11,652,813 B2
(45) Date of Patent: May 16, 2023

(54) SYSTEMS AND METHODS FOR REAL-TIME IDENTITY VERIFICATION USING A TOKEN CODE

(71) Applicant: MASTERCARD INTERNATIONAL INCORPORATED, Purchase, NY (US)

(72) Inventors: Keyur Patel, Jersey City, NJ (US); Sachin Ahuja, Millstone Township, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 482 days.

(21) Appl. No.: 16/593,012

(22) Filed: Oct. 4, 2019

(65) Prior Publication Data
US 2021/0105264 A1    Apr. 8, 2021

(51) Int. Cl.
H04L 9/40     (2022.01)
H04L 9/32     (2006.01)

(52) U.S. Cl.
CPC ........ *H04L 63/0823* (2013.01); *H04L 9/3213* (2013.01); *H04L 9/3228* (2013.01); *H04L 63/0428* (2013.01)

(58) Field of Classification Search
None
See application file for complete search history.

(56) References Cited

U.S. PATENT DOCUMENTS

| 6,223,289 B1 | 4/2001 | Wall et al. |
| 7,730,321 B2 | 6/2010 | Gasparini et al. |
| 7,886,156 B2 | 2/2011 | Franchi |

(Continued)

FOREIGN PATENT DOCUMENTS

| EP | 961193 A2 | 9/2010 |
| WO | 2010139250 A1 | 12/2010 |

(Continued)

OTHER PUBLICATIONS

PCT International Search Report and Written Opinion, Application No. PCT/US2020/046908, dated Oct. 29, 2020, 13 pps.

(Continued)

*Primary Examiner* — Arezoo Sherkat
(74) *Attorney, Agent, or Firm* — Armstrong Teasdale LLP

(57) ABSTRACT

An identity authority computing device having a processor in communication with a database is described herein. The database stores a plurality of persistent user identifiers associated with a plurality of users. The processor is programmed to receive a service request over a public network, the service request including a service provider identifier and a single-use token value associated with one of the users. The processor is also programmed to determine at least one persistent user identifier associated in the database with the token value, and generate an updated service request including the at least one persistent user identifier. The processor further is programmed to generate an encrypted service request using a public encryption key associated with the service provider identifier, and transmit the encrypted service request to a service provider computing device associated with the service provider identifier.

20 Claims, 11 Drawing Sheets

(56) References Cited

U.S. PATENT DOCUMENTS

| | | |
|---|---|---|
| 8,812,860 B1 | 8/2014 | Bray |
| 9,811,684 B1 | 11/2017 | Sterling et al. |
| 10,219,154 B1 | 2/2019 | Hallock |
| 10,984,434 B1* | 4/2021 | Arya ................. G06Q 20/22 |
| 11,055,727 B1* | 7/2021 | Kumar ............. H04L 63/1408 |
| 11,257,085 B1* | 2/2022 | Barkas ............... G06Q 20/401 |
| 2003/0074564 A1 | 4/2003 | Peterson |
| 2005/0264397 A1 | 12/2005 | Coelho et al. |
| 2006/0288405 A1 | 12/2006 | Albisu et al. |
| 2007/0162961 A1 | 7/2007 | Tarrance et al. |
| 2008/0212771 A1 | 9/2008 | Hauser |
| 2008/0313088 A1* | 12/2008 | Cahn ................ G06Q 20/3674 |
| | | 705/50 |
| 2008/0313707 A1 | 12/2008 | Jain et al. |
| 2011/0055585 A1 | 3/2011 | Lee |
| 2011/0161233 A1 | 6/2011 | Tieken |
| 2011/0213807 A1 | 9/2011 | Mattsson |
| 2011/0239283 A1 | 9/2011 | Chern |
| 2012/0278897 A1* | 11/2012 | Ang ..................... H04L 61/301 |
| | | 726/26 |
| 2013/0081125 A1 | 3/2013 | Ho et al. |
| 2013/0133059 A1* | 5/2013 | Maman ............... H04L 63/102 |
| | | 726/12 |
| 2013/0191884 A1 | 7/2013 | Leicher et al. |
| 2013/0208893 A1 | 8/2013 | Shablygin et al. |
| 2013/0226813 A1 | 8/2013 | Voltz |
| 2013/0318348 A1* | 11/2013 | Lebron ............. H04L 63/0428 |
| | | 713/168 |
| 2014/0013452 A1 | 1/2014 | Aissi et al. |
| 2014/0075513 A1 | 3/2014 | Trammel et al. |
| 2014/0177825 A1* | 6/2014 | Mattsson ............... H04L 9/06 |
| | | 380/28 |
| 2014/0229462 A1* | 8/2014 | Lo ..................... G06F 16/951 |
| | | 707/707 |
| 2015/0127547 A1 | 5/2015 | Powell et al. |
| 2015/0254645 A1 | 9/2015 | Bondesen et al. |
| 2017/0140174 A1* | 5/2017 | Lacey ............... G06Q 20/4016 |
| 2017/0200155 A1* | 7/2017 | Fourez .............. G06Q 20/367 |
| 2017/0221054 A1* | 8/2017 | Flurscheim ........ G06Q 20/3276 |
| 2017/0352039 A1 | 12/2017 | Malkawi |
| 2018/0034796 A1 | 2/2018 | Ross et al. |
| 2018/0192287 A1 | 7/2018 | Ozzie |
| 2019/0044940 A1* | 2/2019 | Khalil .................. H04W 12/06 |
| 2019/0087825 A1* | 3/2019 | Bhatt ..................... G07F 7/125 |
| 2019/0147170 A1* | 5/2019 | Keselman ................ H04L 9/08 |
| | | 713/189 |
| 2020/0186566 A1 | 6/2020 | Fox |
| 2020/0211002 A1* | 7/2020 | Steinberg ............. G06Q 20/385 |
| 2020/0234288 A1 | 7/2020 | Diana et al. |

FOREIGN PATENT DOCUMENTS

| | | |
|---|---|---|
| WO | 2013101297 A1 | 7/2013 |
| WO | 2014153979 A1 | 10/2014 |
| WO | 2017028804 A1 | 2/2017 |
| WO | 2017210563 A1 | 12/2017 |

OTHER PUBLICATIONS

Better Explained, "Quick Guide to GUIDs", (Year: 2014).

Jensen et al., "On Technical Security Issues in Cloud Computing", 2009 IEEE International Conference on Cloud Computing, Date of Conference: Sep. 21-25 (Year: 2009).

PCT International Search Report and Written Opinion, Application No. PCT/US2020/046912, dated Nov. 30, 2020, 10 pps.

* cited by examiner

SYSTEMS AND METHODS FOR REAL-TIME IDENTITY VERIFICATION USING A TOKEN CODE

BACKGROUND

This disclosure relates generally to secure data transmission systems, and more specifically, to real-time identity verification using token codes.

Persistent user identifiers, such as driver's license numbers and social security numbers, may be used to identify users, access records associated with the user, and/or verify the user's identity. For example, bank records associated with a specific user may be retrieved using a user's social security number, where retrieving user records using a name may be imprecise due to multiple users having the same name. As another example, a persistent user identifier may be considered a secret known only by the user, and thus, said secret may be used to verify the user's identity. For example, bank records including a social security number may be provided to a user after they prove they know the secret value (e.g., the social security number).

For at least these reasons, persistent user identifiers are extremely high value data from a computing perspective. Cybersecurity principles suggest that persistent user identifiers should not be transmitted in clear text, and further, even encrypted transmission and storage of persistent user identifiers should be minimized to reduce an attack surface and in an effort to maintain the secrecy of the identifiers.

However, as described previously, persistent user identifiers are deeply integrated into existing business practices (e.g., user authentication, record location). Additionally, existing data may be stored (e.g., indexed) based on persistent user identifiers, and restructuring the data to avoid reliance on these identifiers may be particularly time consuming and complex.

There is a need for a computing system configured to minimize the use of persistent user identifiers, while still allowing access to data indexed based on the identifiers.

BRIEF DESCRIPTION

In one aspect, an identity authority computing device is provided. The identity authority computing device includes a processor in communication with a database. The database stores a plurality of persistent user identifiers associated with a plurality of users. The processor is programmed to receive a service request over a public network, the service request including a service provider identifier and a single-use token value associated with one of the users. The processor is also programmed to determine at least one persistent user identifier associated in the database with the token value, and generate an updated service request including the at least one persistent user identifier. The processor further is programmed to generate an encrypted service request using a public encryption key associated with the service provider identifier, and transmit the encrypted service request to a service provider computing device associated with the service provider identifier.

In another aspect, a computer-implemented method for secure transmission of user identifiers is provided. The method is implemented using an identity authority computing device that includes a processor in communication with a database, wherein the database stores a plurality of persistent user identifiers associated with a plurality of users. The method includes receiving a service request over a public network, the service request including a service provider identifier and a single-use token value associated with one of the users. The method also includes determining at least one persistent user identifier associated in the database with the token value, and generating an updated service request including the at least one persistent user identifier. The method further includes generating an encrypted service request using a public encryption key associated with the service provider identifier, and transmitting the encrypted service request to a service provider computing device associated with the service provider identifier.

In another aspect, a non-transitory computer readable storage media having computer-executable instructions embodied thereon is provided. The computer-executable instructions are executable by an identity authority computing device having a processor coupled to a database, the database storing a plurality of persistent user identifiers associated with a plurality of users. When executed, the instructions cause the processor to receive a service request over a public network, the service request including a service provider identifier and a single-use token value associated with one of the users. The instructions also cause the processor to determine at least one persistent user identifier associated in the database with the token value, and generate an updated service request including the at least one persistent user identifier. The instructions further cause the processor to generate an encrypted service request using a public encryption key associated with the service provider identifier, and transmit the encrypted service request to a service provider computing device associated with the service provider identifier.

DETAILED DESCRIPTION

Figure 1:
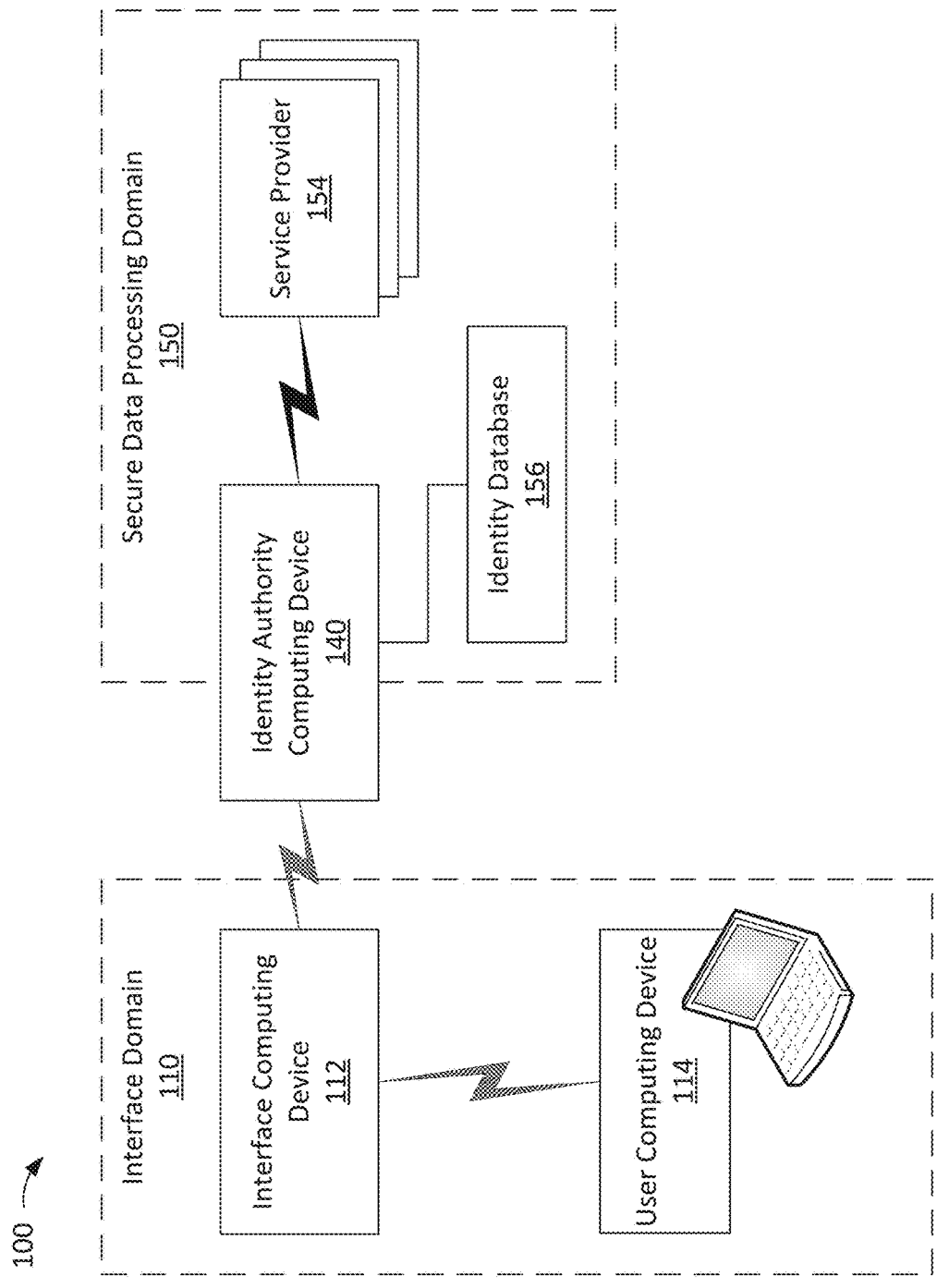
FIG. 1 is a schematic diagram illustrating an example identity authority system.

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

An identity authority system including an identity authority computing device is described herein. The identity authority computing device is in communication with at least one service provider, which stores and processes data using persistent user identifiers. The identity authority computing device is further in communication with an interface computing device, which stores and processes data using temporary user identifiers (e.g., session identifiers, token values).

In one embodiment, the service providers include credit reporting services/databases. For example, credit records may be stored and retrieved using a social security number. As another example, the service provider is a public records service, and vehicle incident reports may be indexed using a driver's license number.

In one embodiment, a user computing device registers with the identity authority computing device. As part of the registration, the identity authority computing device stores the user's persistent user identifier in a user profile, for example in an identity database, and also assigns a token to the user profile. The identity authority computing device activates the token on the user computing device, such that the user computing device is configured to generate token values (e.g., temporary user identifiers). The token values, when subsequently transmitted to the identity authority computing device, enable the identity authority computing device to verify the identity of the user computing device and match it to the user profile. In one embodiment, the identity authority computing device is configured to decrypt the token value and verify the result against a token secret, which is associated with the user profile in the identity database. In another embodiment, the token includes preset token values which are associated with the user profile.

In certain embodiments, the interface computing device provides a web application to the user computing device. For example, the web application may enable a user to apply for a credit card or a cellular service. The interface computing device may use temporary user identifiers to avoid storing confidential user data (e.g. persistent user identifiers) on, and/or transmitting confidential user data to, a public-facing computing device (e.g., a web server).

In an example embodiment, after the user computing device is registered with the identity authority computing device, the interface computing device prompts the user computing device for a token value. Such a "token request" may be included as part of a mobile application or a web application transmitted to the user computing device (e.g., a smartphone). Subsequently, the identity authority computing device receives a service request, including the token value. The identity authority computing device accesses an identity database to determine at least one persistent user identifier associated with the token value, and transmits the service request and the persistent user identifier to a service provider. The service provider retrieves result data associated with the persistent user identifier. The service provider may return the result data to the interface computing device and/or to the identity authority computing device. In some embodiments, the identity authority computing device filters persistent user identifiers from the result prior to forwarding to the interface computing device.

In one embodiment, a user interacts with a cellular service registration application on a user computing device, where the application is provided by the interface computing device. The cellular service registration application includes a token request. The user retrieves a token value generated by the user computing device, and inputs the token value into the cellular service registration application.

The interface computing device, executing the cellular service registration application, generates and transmits a service request to the identity authority computing device. The service request includes the token value. In the example embodiment, the service request includes a request for a credit score, which may be used to validate the cellular service registration.

The identity authority computing device receives the service request, and determines any number of persistent user identifiers associated with the token value. The identity authority computing device may subsequently transmit an updated service request, including one or more of the persistent user identifiers (e.g., social security number), to a service provider (e.g., credit score provider), on behalf of the interface computing device.

The identity authority computing device retrieves token data, persistent user identifiers, and confidential user data from any number of identity databases. In some embodiments, an identity database may be associated with a payment card issuer, such as a bank. In one embodiment, the identity authority computing device is in communication with multiple identity databases, such that confidential user data (e.g., persistent user identifiers) may be retrieved from multiple payment card issuers. In other words, the identity authority computing device may be configured to centralize access to persistent user identifiers stored by payment card issuers. For example, persistent user identifiers may be provided to a bank by a user when establishing an account, and leveraging the stored persistent user identifiers reduces the need for redundant storage and transmission of sensitive persistent user identifiers.

In the example embodiment, the service provider and identity authority computing device have a secure connection. More specifically, the service provider and identity authority computing device may have a virtual private network (VPN) connection. In other words, the identity authority computing device and one or more service providers are in a secure data processing domain, which is generally isolated from the public Internet and unrelated computing devices. This may reduce the need for persistent user identifiers to be transmitted over public networks, and reduce the number of locations where persistent user identifiers are stored.

The service provider generates a response to the service request, which may include the credit score associated with the social security number. In one embodiment, the service provider transmits the service response to the interface computing device. Alternatively, the service provider may transmit the service response to the identity authority computing device. In certain embodiments, the identity authority computing device may filter out persistent user identifiers from service responses before forwarding the service responses to the interface computing device.

Retrieving credit scores and/or credit history may require providing a social security number. However, storing and processing social security numbers and other persistent user identifiers may be subject to data privacy regulations, security compliance standards, and the like. Additionally, persistent user identifiers transmitted in clear text are a common target for cyberattacks. One aspect of the disclosure includes reducing processing and/or storage of persistent user identifiers by interface computing devices (e.g., webservers, mobile application providers).

The technical problems addressed by the disclosure include at least one of: (i) data safety risks associated with redundant storage and transmission of persistent user identifiers, (ii) data safety risks associated with storage of persistent user identifiers on computing devices with high public exposure, (iii) data safety risks associated with insecure transmission of persistent user identifiers and user data, and (iv) data safety risks associated with persistent user identifiers required to retrieve user data.

The resulting technical benefits achieved by the systems and methods of the disclosure include at least one of: (i) reduced use of persistent user identifiers as an authentication factor, (ii) reduced storage of persistent user identifiers across different computing systems, (iii) reduced unsecured transmission of persistent user identifiers, and (iv) access to secure user data using temporary user identifiers instead of persistent user identifiers.

The systems and methods of the disclosure are implemented using computer programming or engineering techniques including computer software, firmware, hardware, or any combination or subset thereof, wherein the technical effects are achieved by: (i) receiving a service request over a public network, the service request including a service provider identifier and a single-use token value associated with one of the users; (ii) determining at least one persistent user identifier associated in the database with the token value; (iii) generating an updated service request including the at least one persistent user identifier; (iv) generating an encrypted service request using a public encryption key associated with the service provider identifier; and (v) transmitting the encrypted service request to a service provider computing device associated with the service provider identifier.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating identity authority system 100. Identity authority system 100 includes at least two domains (e.g., networks, virtual computing environments), interface domain 110 and secure data processing domain 150. In certain aspects, interface domain 110 and secure data processing domain 150 may function as front-end and back-end computing systems. However, secure data processing domain 150 includes an identity authority computing device 140 in secure data communication between interface domain 110 and secure data processing domain 150. In other words, identity authority computing device 140 prevents interface domain 110 from accessing confidential data stored and/or processed on secure data processing domain 150, while facilitating the operation of interface domain 110 using temporary identifiers and token values.

Interface domain 110 includes an interface computing device 112. Interface computing device 112 provides an application (e.g., mobile application, web application) to a user computing device 114. More specifically, interface computing device 112 generates and transmits application views (e.g., web pages, mobile application states) to user computing device 114. In the example embodiment, user computing device 114 is in communication with interface computing device 112 over a wide area network, such as a cellular network or the Internet. In other words, this connection may not be completely secure, from data breaches or cyber-attacks.

Interface computing device 112 is in communication with identity authority computing device 140 over a potentially insecure wide area network, such as the Internet. Identity authority computing device 140 is further securely connected to at least one identity database 156, and to at least one service provider 154. For example, identity authority computing device 140 may be connected to a private network, such as a virtual private network or a multiprotocol label switching (MPLS) network.

In the example embodiment, identity authority computing device 140 is directly connected to identity database 156. Alternatively, identity database 156 may be connected to identity authority computing device 140 over a network connection. Identity database 156 stores confidential user data, for example, persistent user identifiers (e.g., social security numbers, driver's license number). Identity database 156 also associates user devices and tokens with persistent user identifiers.

In some embodiments, identity database 156 is associated with a payment card issuer, such as a bank. In one embodiment, identity authority computing device 140 is in communication with multiple identity databases, such that confidential user data (e.g., persistent user identifiers) may be retrieved from multiple payment card issuers. In other words, identity authority computing device 140 may be configured to centralize access to persistent user identifiers stored by payment card issuers. For example, persistent user identifiers may be provided to a bank by a user when establishing an account, and leveraging the stored persistent user identifiers reduces the need for redundant storage and transmission of sensitive persistent user identifiers. In one embodiment, identity authority computing device 140 is configured to establish an on-demand VPN connection to identity database 156. In another embodiment, identity authority computing device 140 uses a private multiprotocol label switching (MPLS) network to communicate with identity database 156.

Identity authority computing device 140 is connected to any number of service providers 154. Service providers 154 may be HTTP (hypertext transfer protocol) based API (application programming interface) applications, and/or computing devices. In the example embodiment, service provider 154 is a HTTP API interface to a credit history service. Identity authority computing device 140 may request a credit history from service provider 154 using a persistent identifier retrieved from identity database 156. Alternate service providers may include background check services, credit scoring services, public records services, and the like.

Figure 2:
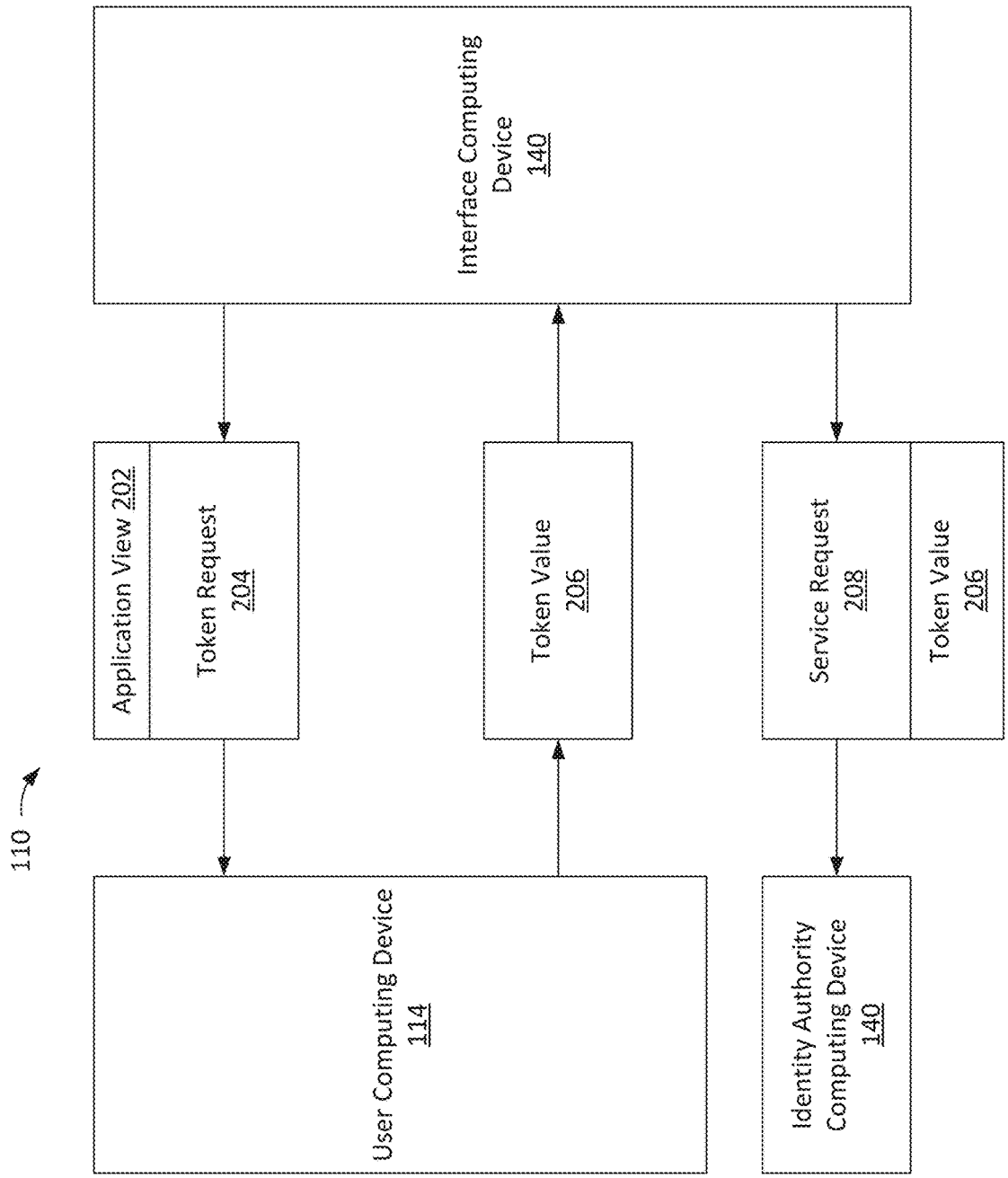
FIG. 2 is an example data flow diagram illustrating generating a service request based on a token value, using the identity authority system shown in FIG. 1.

FIG. 2 is an example data flow diagram illustrating identity authority system 100 (shown in FIG. 1) generating a service request using a token value. In FIG. 2, interface computing device 112 transmits an application view 202, including a token request 204, to user computing device 114. Application view 202 includes one or more webpages, mobile application states, and the like. Token request 204 may be an interactive form field configured to capture a token value 206. Alternatively, token request 204 is a computer-executable instruction to generate and transmit token value 206. In other words, token request 204 may be user interactive, or may automatically retrieve token value 206.

In one embodiment, application view 202 is a registration form for a cellular service, and token request 204 is associated with verifying the authenticity of the registration.

Token value 206 is generated by user computing device 114. In the example embodiment, token value 206 is randomly generated, unique, and temporary. In at least one aspect, token value 206 may be a one-time-password (OTP). In one embodiment, user computing device 114 generates token value 206 based on a secret shared by identity authority computing device 140 during a previous registration process (one example of which is described in FIG. 6), such that identity authority computing device 140 is capable of determining if token value 206 was properly generated by user computing device 114. In an alternate embodiment, user computing device 114 may have previously retrieved token value 206 from identity authority computing device 140 in association with the previous registration process. For example, user computing device 114 may have stored for future use a certain number of token values previously received from identity authority computing device 140.

Interface computing device 112 generates and transmits a service request 208, including token value 206, to identity authority computing device 140. Service request 208 requests a value-added service (VAS) from identity authority computing device 140. For example, service request 208 may include a request for score data (e.g., credit score, safe driving score), consumer history data (e.g., driving records, vehicle registration records, credit history), individual background checks (e.g., public record data), and the like. In general, service request 208 requires processing of private and/or confidential user data. For example, a credit score may be generated based on credit history and public record data associated with a persistent user identifier.

Figure 6:
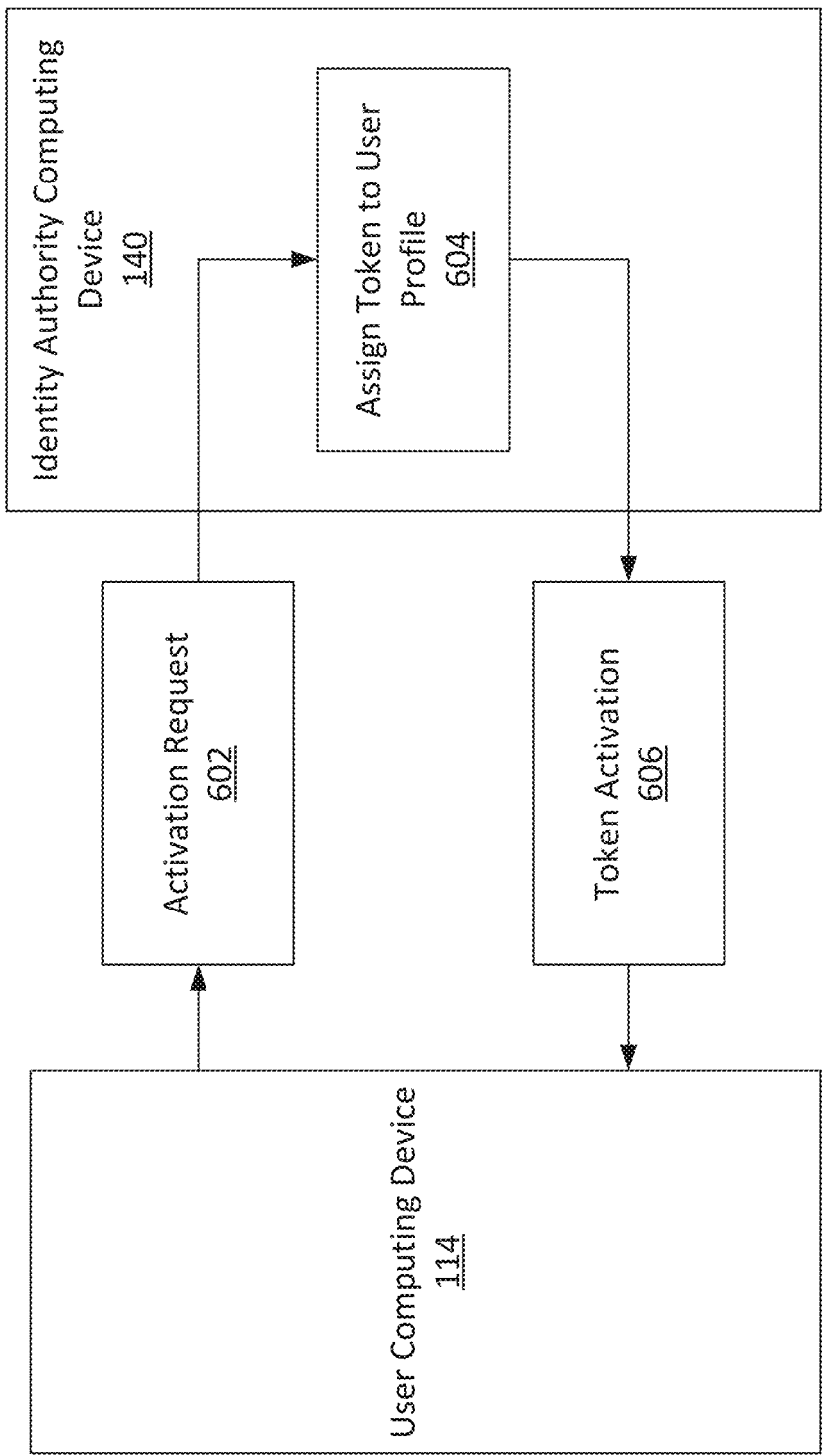
FIG. 6 is a data flow diagram illustrating a user computing device registering with the identity authority system shown in FIG. 1.

Service request 208 includes token value 206. In the example embodiment, service request 208 does not include any persistent user identifiers (e.g., social security numbers, driver's license numbers), such that interface computing device 112 is not required to store confidential user data (e.g., persistent user identifiers). Instead, interface computing device 112 may interact with user computing device 114 and identity authority computing device 140 using token value 206, while identity authority computing device 140 determines any number of persistent user identifiers associated with token value 206 to retrieve and process confidential user data, as shown in FIG. 6.

Figure 3:
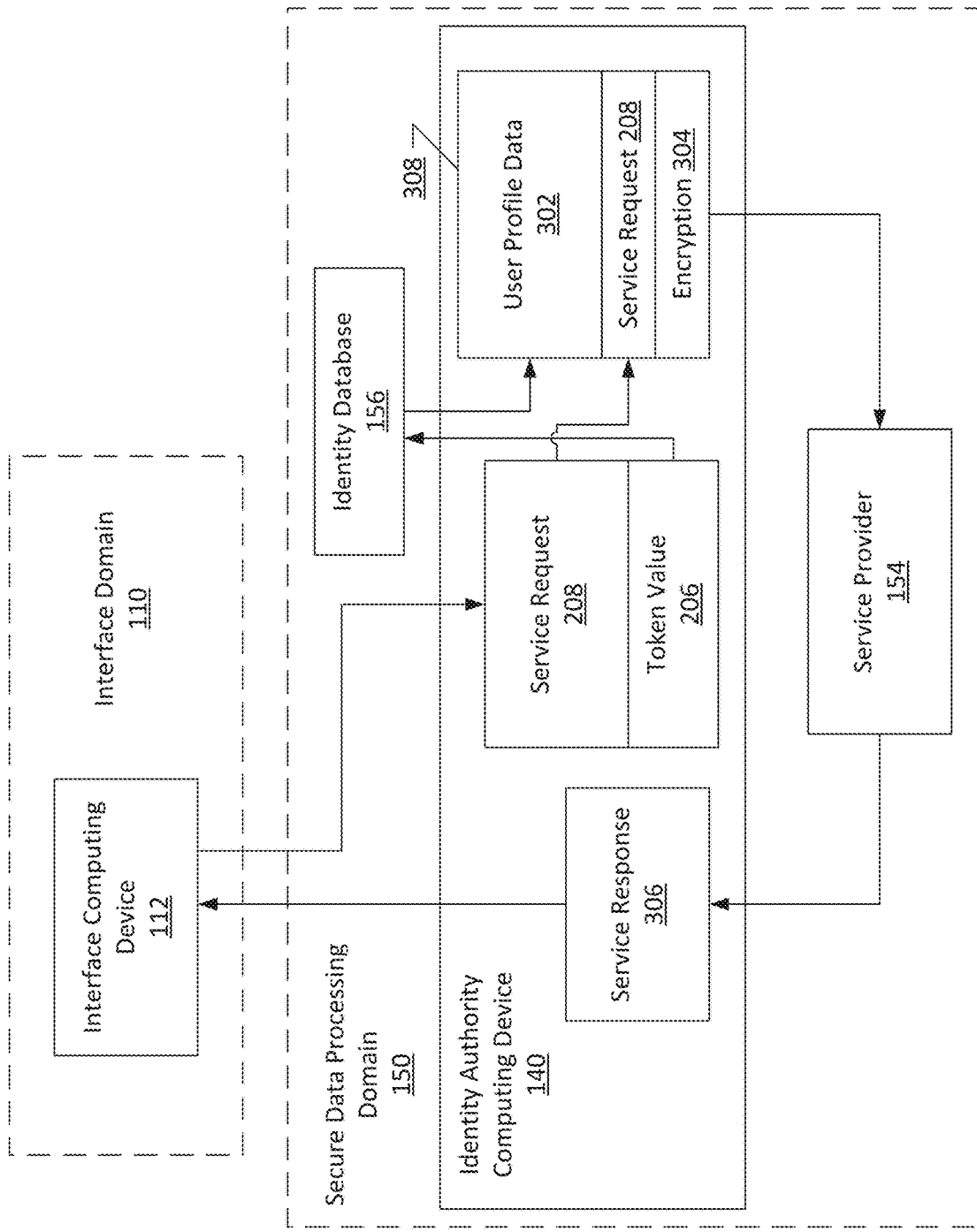
FIG. 3 is an example data flow diagram illustrating generating a service response based on a persistent user identifier, using the identity authority computing system shown in FIG. 1.

FIG. 3 is a data flow diagram illustrating identity authority system 100 (shown in FIG. 1) generating a service response based on a persistent user identifier. Identity authority computing device 140 receives service request 208 from interface computing device 112. Service request 208 includes token value 206.

Interface computing device 112, within interface domain 110, generates application views (as shown in FIG. 2) that enable retrieval of token value 206 from user computing device 114. Token value 206 is a tokenized temporary user identifier, such that compromise of interface domain 110 does not result in the compromise of persistent user identifiers (e.g., social security numbers).

Secure data processing domain 150 includes identity authority computing device 140, identity database 156, and service provider 154. Secure data processing domain 150 includes any number of computing devices storing and processing user profile data based on persistent user identifiers (e.g., social security numbers, driver's license numbers).

Identity authority computing device 140 receives service request 208, including token value 206, from interface computing device 112. To properly retrieve the data required for service request 208, identity authority computing device 140 retrieves user profile data 302, including at least one persistent user identifier associated with token value 206, from identity database 156. In some embodiments, identity authority computing device 140 may need to decrypt token value 206 to retrieve the persistent user identifier.

In certain embodiments, identity authority computing device 140 is configured to retrieve other user profile data (e.g., payment card numbers, addresses, email addresses) based on token value 206. As shown in FIG. 6, token value 206 may be based on a token secret. In one embodiment, identity authority computing device 140 is configured to decrypt token value 206 to determine the token secret, where the token secret is associated with a user profile stored in identity database 156. In another embodiment, token value 206 may be a pre-shared value generated by identity authority computing device 140 and associated with the user profile stored in identity database 156.

Identity authority computing device 140 creates an updated service request 308 by adding user profile data 302 to service request 208. Identity authority computing device 140 further encrypts 304 updated service request 308 using a method associated with service provider 154 identified in service request 208. More specifically, identity authority computing device 140 may determine a service provider identifier based on service request 208, and retrieve a public encryption key associated with the service provider identifier. For example, identity authority computing device 140 may store service provider public encryption keys.

In one embodiment, updated service request 308 is encrypted using RSA encryption. More specifically, identity authority computing device 140 may encrypt updated service request 308 using a public key associated with service provider 154, and service provider 154 may decrypt updated service request 308 using a stored corresponding private key.

Service provider 154 responds to updated service request 308 by processing data linked to the at least one persistent user identifier in user profile data 302 to obtain response data. In other words, service provider 154 need not use tokenized user identifiers in place of persistent user identifiers because it is within secure data processing domain 150, and thus faces fewer security risks. Thus, restructuring of legacy records of service providers 154 indexed by persistent user identifier is not required.

In one embodiment, service provider 154 is a HTTP API (hypertext transfer protocol application programming interface) to a credit score generation service. Identity authority computing device 140 may transmit a request including a social security number (e.g., updated service request 308) to service provider 154. Service provider 154 then generates an XML (extensible markup language) and/or JSON (JavaScript object notation) service response 306 including the requested credit score as the response data, and transmits service response 306 back to identity authority computing device 140.

Service provider 154 may perform any suitable data processing and/or retrieval based on the at least one persistent user identifier included in user profile data 302. Secure data processing domain 150 may include any number of service providers 154. For example, service providers 154 may include consumer credit scoring services, consumer credit history services, public records services, personal background check services, identity verification services, and the like. As used herein, 'service' refers to an abstracted programmatic interface, such as a HTTP API or a remote procedure call (RPC), to a computing device and/or a database system. At least one aspect of identity authority computing device 140 is facilitating interface computing device 112 to interact with service providers 154 that are dependent on persistent user identifiers (e.g., service provider 154) without requiring interface computing device 112 to store and/or transmit persistent user identifiers, and more specifically to facilitate interface computing device 112 to interact with service provider 154 by using token values (e.g., temporary user identifiers).

In one embodiment, identity authority computing device 140 transmits service response 306 received from service provider 154 to interface computing device 112. In some embodiments, identity authority computing device 140 is configured to filter persistent user identifiers and/or other confidential user data from service response 306. For example, identity authority computing device 140 may replace a persistent user identifier in service response 306 with token value 206, such that interface computing device 112 may associate the forwarded service response 306 with service request 208 without using a persistent user identifier.

Interface computing device 112 receives service response 306, forwarded from identity authority computing device 140, and may further generate and transmit an application view based on service response 306 to user computing device 114, shown in FIG. 1. For example, interface computing device 112 may generate a visualization of a credit score and/or credit history. Alternatively, interface computing device 112 may receive a service response directly from service provider 154, as discussed below.

Figure 4:
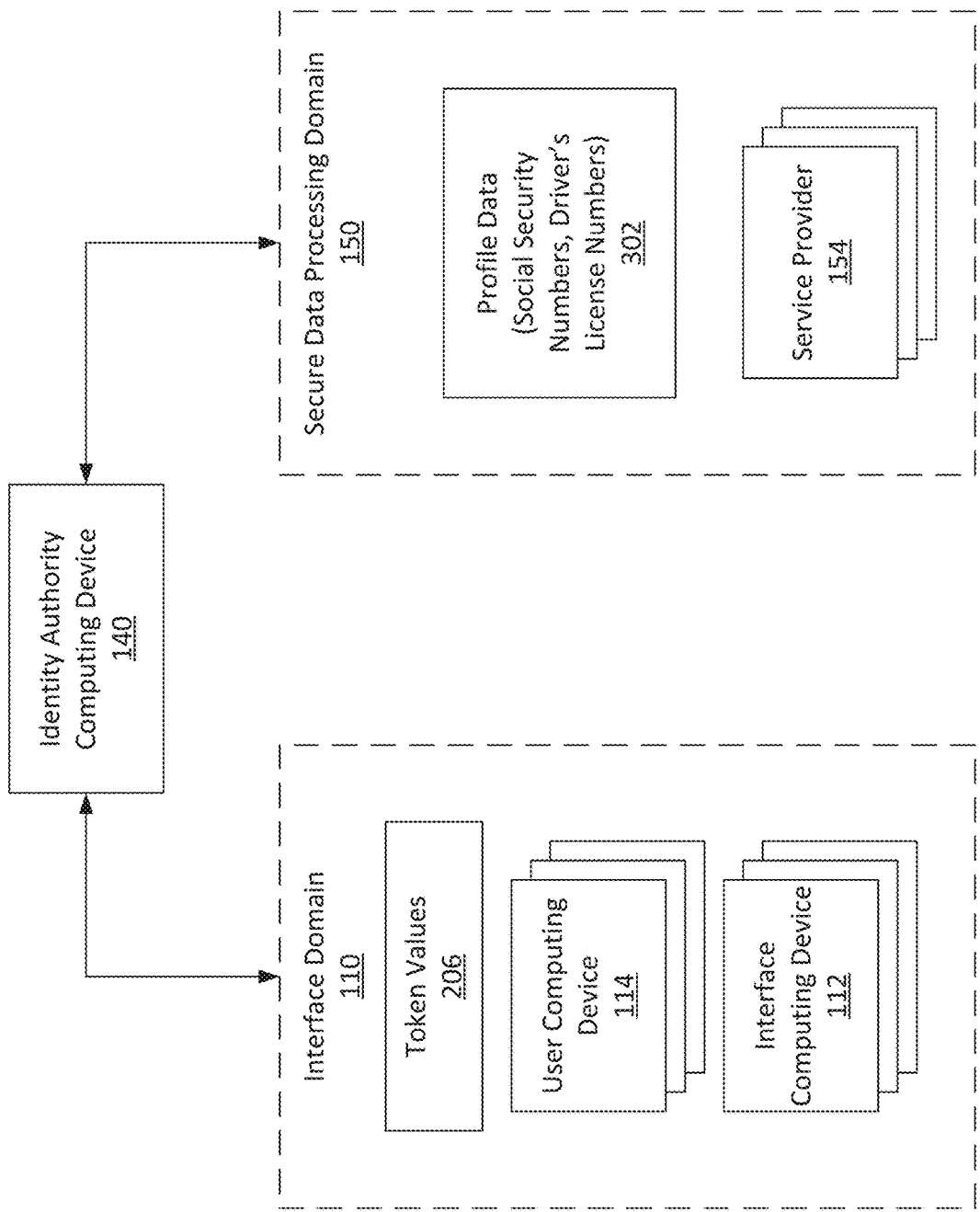
FIG. 4 is a schematic diagram illustrating an interface domain and a secure data processing domain, using the identity authority system shown in FIG. 1.

FIG. 4 is a schematic diagram illustrating interface domain 110 and secure data processing domain 150. Temporary user identifiers (e.g., token values 206) are used by interface computing device 112 in interface domain 110. For example, data may be stored and indexed in interface domain 110 using token values 206. Interface domain 110 is in communication with any number of user computing devices 114, and may include a wide area network such as the Internet. In other words, interface computing device 112 is connected to the Internet, and uses temporary user identifiers instead of persistent user identifiers.

Secure data processing domain 150 includes at least one service provider 154. In some embodiments, secure data processing domain 150 may include a virtual private network (VPN) and/or a multiprotocol label switching (MPLS) network. Secure data processing domain 150, including service provider 154, stores and processes user profile data 302 (e.g., confidential user data, credit history data, vehicle insurance data) using persistent user identifiers (e.g., social security numbers, driver's license numbers, passport numbers, and the like).

Identity authority computing device 140 is connected to interface domain 110 and secure data processing domain 150. Identity authority computing device 140 translates between token values 206 and persistent user identifiers in user profile data 302, and enables communication between interface computing device 112 and service provider 154, without requiring interface computing device 112 to store persistent user identifiers.

Figure 5:
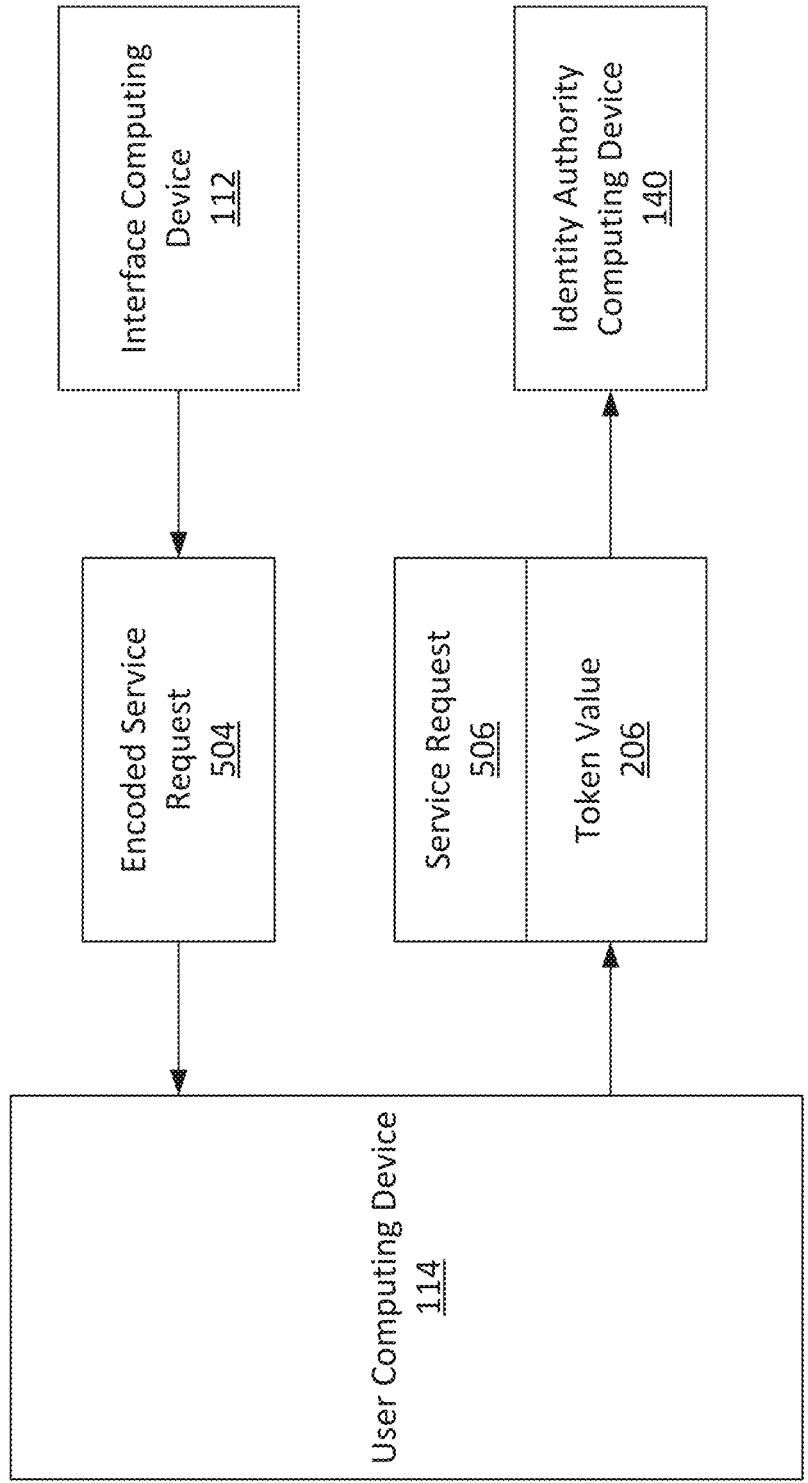
FIG. 5 is an example data flow diagram illustrating an alternate process for generating a service request using a token value using the identity authority system shown in FIG. 1.

FIG. 5 is an example data flow diagram illustrating an alternate process for generating a service request using a token value. In some embodiments, as shown in FIG. 2, interface computing device 112 may receive a token value from user computing device 114 before transmitting a service request to identity authority computing device 140. In other embodiments, user computing device 114 may transmit a service request 506 including token value 206 directly to identity authority computing device 140.

In other words, user computing device 114 may transmit service request 506, including token value 206, to identity authority computing device 140 on behalf of interface computing device 112.

Service request 506 is based on an encoded service request 504 received by user computing device 114 from interface computing device 112. Encoded service request 504 may be received using temporary (e.g., 'ad hoc', decentralized, self-configuring) local data communication. For example, user computing device may scan a quick read (QR) code, or receive a Bluetooth low energy transmission. (Bluetooth is a registered trademark of Bluetooth Sig, Inc., Kirkland, Del.). Other temporary local data communication processes may further include radio-frequency tags and duplex audio data transmission.

Figure 8:
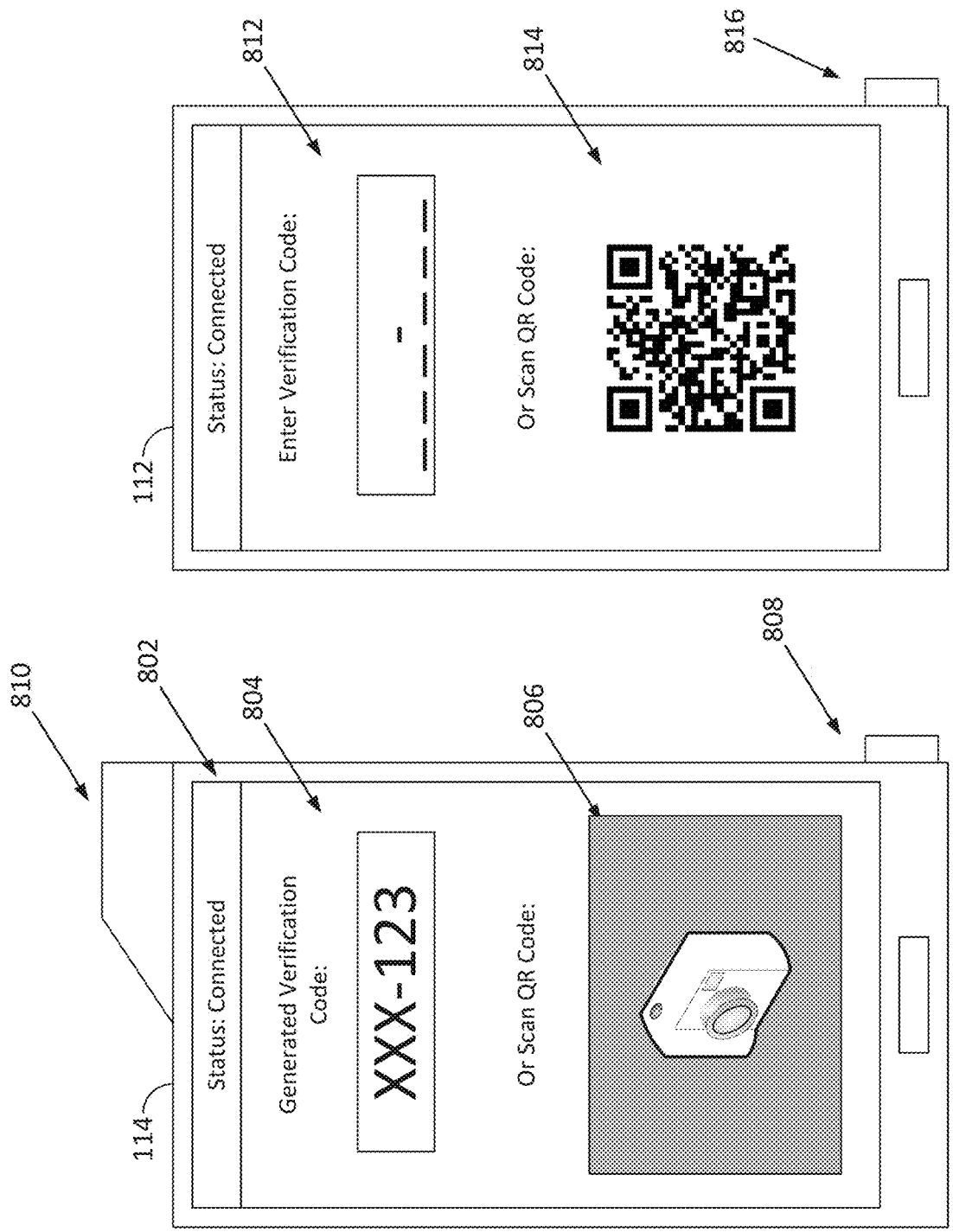
FIG. 8 is a schematic diagram illustrating an example user computing device and example interface computing device of the identity authority computing system shown in FIG. 1.

In some embodiments, encoded service request 504 is computer executable instructions embedded in a webpage (e.g., a JavaScript module), configured to cause user computing device 114 to generate and transmit service request 506. In alternate embodiments, encoded service request 504 is a quick read (QR) code, as shown in FIG. 8, configured to be scanned using a camera interface of user computing device 114.

In one embodiment, interface computing device 112 is a point of sale computing device including a screen configured to display a quick read code (e.g., encoded service request 504). User computing device 114 may scan encoded service request 504, generate token value 206 in response to the scan, and transmit service request 506 including token value 206 to identity authority computing device 140.

An existing secure connection may be used to transmit service request 506, including token value 206, to identity authority computing device 140. More specifically, user computing device 114 may execute a mobile application provided by identity authority computing device 140, where the mobile application is configured to cause user computing device 114 to scan encoded service request 504. As shown in FIG. 6, user computing device 114 may activate/register with identity authority computing device 140 before generating token values (e.g., token value 206).

FIG. 6 is a data flow diagram illustrating user computing device 114 registering with identity authority computing device 140. In the example embodiment, user computing device 114 sends an activation request 602 to identity authority computing device 140. For example, a user might enable token functionality in a mobile banking application associated with a financial institution associated with identity authority computing device 140, and user computing device 114 may use the existing secure connection associated with the mobile banking application to securely transmit activation request 602 to identity authority computing device 140.

Identity authority computing device 140 assigns one or more token values 206, or a token secret that may be used to generate token value 206, to a stored user profile 604. In certain embodiments, where the activation request 602 was generated using a mobile banking application, identity authority computing device 140 may assign token value 206 or a token secret to an online banking user profile 604 based on the activation request, where the online banking user profile also includes previously stored persistent user identifiers. In other embodiments, activation request 602 includes any number of persistent user identifiers, which may be assigned a token secret. In other words, user profile 604 may be created in response to activation request 602, rather than using a previously stored user profile 604 (e.g., online banking user profile). Identity authority computing device 140 generates a token secret or one or more token values 206, associates the token secret or the one or more token values 206 with the user profile 604 (e.g., with any number of persistent user identifiers), and transmits the token secret or the one or more token values 206 to user computing device 114 as token activation 606.

User computing device 114 receives token activation 606. In certain embodiments, token activation 606 enables a mobile application, such as a mobile banking application, to generate token values 206 based on the token secret included in activation 606. For example, a one-time password (OTP) may be generated by user computing device 114 based on the token secret, and transmitted as token value 206 to identity authority computing device 140 to verify the identity of user computing device 114 (as shown in FIG. 2). Alternatively, token activation 606 provides the mobile application, such as the mobile banking application, with the one or more token values 206 that can subsequently be transmitted directly to identity authority computing device 140 as needed to verify the identity of user computing device 114 (as shown in FIG. 2).

Figure 7:
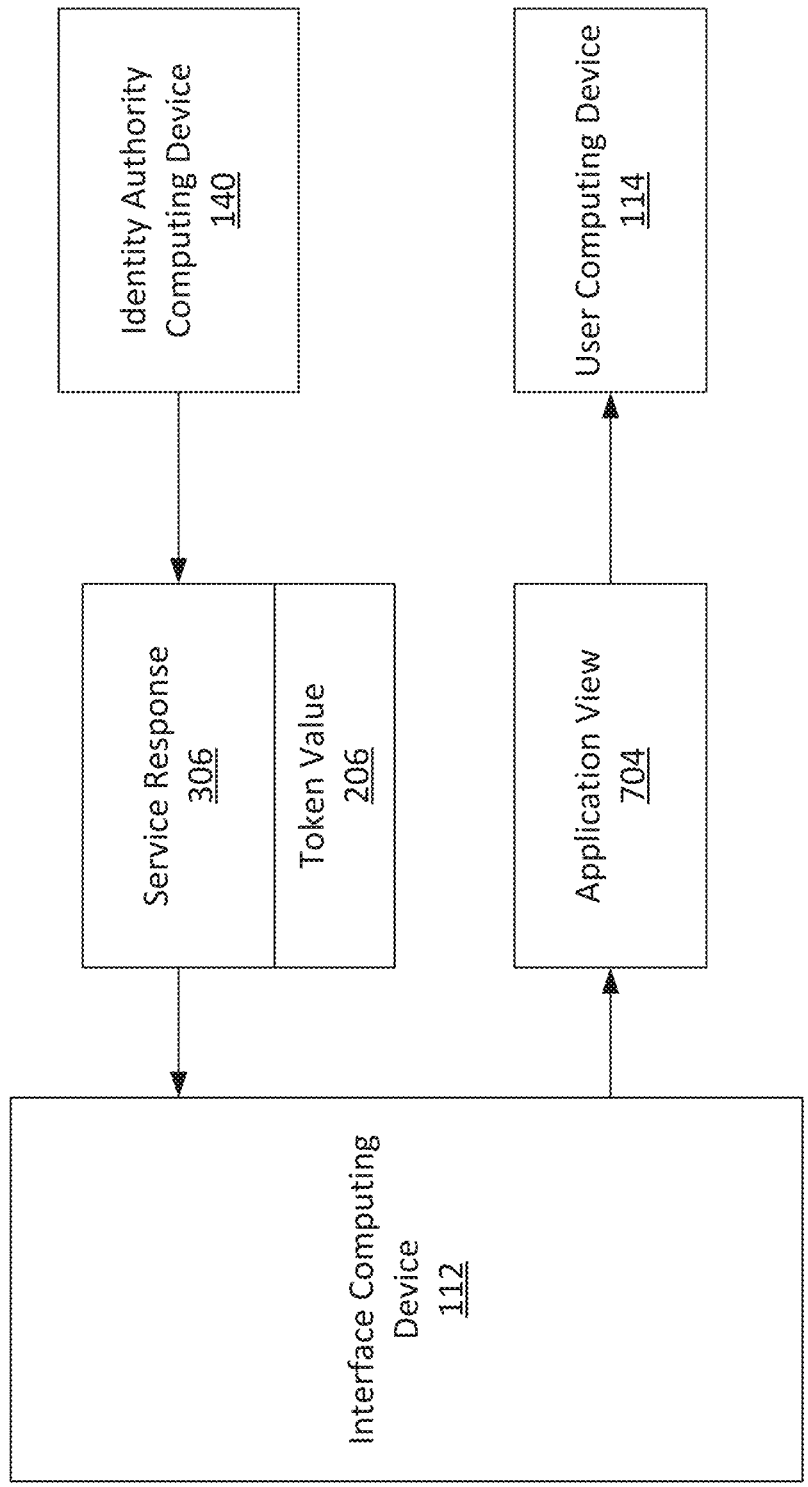
FIG. 7 is an example data flow diagram illustrating an interface computing device receiving a service response from an identity authority computing device as shown in FIG. 1.

FIG. 7 is an example data flow diagram illustrating interface computing device 112 receiving service response 306 from identity authority computing device 140 in response to service request 506 (shown in FIG. 5) or service request 208 (shown in FIG. 2). After interface computing device 112 receives service response 306 (e.g., a credit score), interface computing device 112 generates an application view 704. In the example embodiment, interface computing device 112 may use a credit score received in service response 306 to generate a credit decision application view (e.g., application view 704). In an alternate embodiment, where service response 306 includes vehicle insurance data, application view 704 may include summaries of recent vehicle accidents.

Interface computing device 112 associates service response 306 with user computing device 114 using token value 206. In other words, the temporary user identifier (e.g., token value 206) is used to generate application view 704.

In one embodiment, the application view 704 is a webpage generated and transmitted to user computing device 114, where user computing device 114 is executing a web browser application. In another embodiment, the application view 704 is a mobile application state transmitted to a mobile device (e.g., user computing device 114) executing a mobile application (e.g., a mobile banking application).

FIG. 8 is a schematic diagram illustrating an example user computing device 114 and interface computing device 112. User computing device 114 is a mobile device executing a mobile application configured to generate verification code 804 (e.g., token value 206 shown in FIG. 2) and/or scan a QR code 814. In some embodiments, user computing device 114 includes a camera 810 and/or a wireless network interface 808. In the example embodiment, user computing device 114 is executing mobile application 802, which is configured to generate verification code 804. Verification code 804 may be generated by user computing device 114 using a token secret, for example. In some embodiment, as shown in FIG. 2, user computing device 1214 may transmit service request 208, including verification code 804 as token value 206, to identity authority computing device 140.

Additionally, mobile application 802 is configured to scan quick read (QR) code 814 (e.g., encoded service request 504, shown in FIG. 5). More specifically, mobile application 802 is configured to decode QR code 814 in response to QR code 814 being visible through a preview interface 806 of camera 810. In some embodiments, as shown in FIG. 5, user computing device 114 may transmit service request 506 including token value 206 to identity authority computing device 140 in response to scanning QR code 814.

Interface computing device 112 is configured to display a verification code input field 812 and/or display QR code 814 (e.g., encoded service request 504). Interface computing device 112 includes network interface 816. In one embodiment, interface computing device 112 transmits a service request, such as service request 208, after a verification code (e.g., token value 206) is input into field 812.

Figure 9:
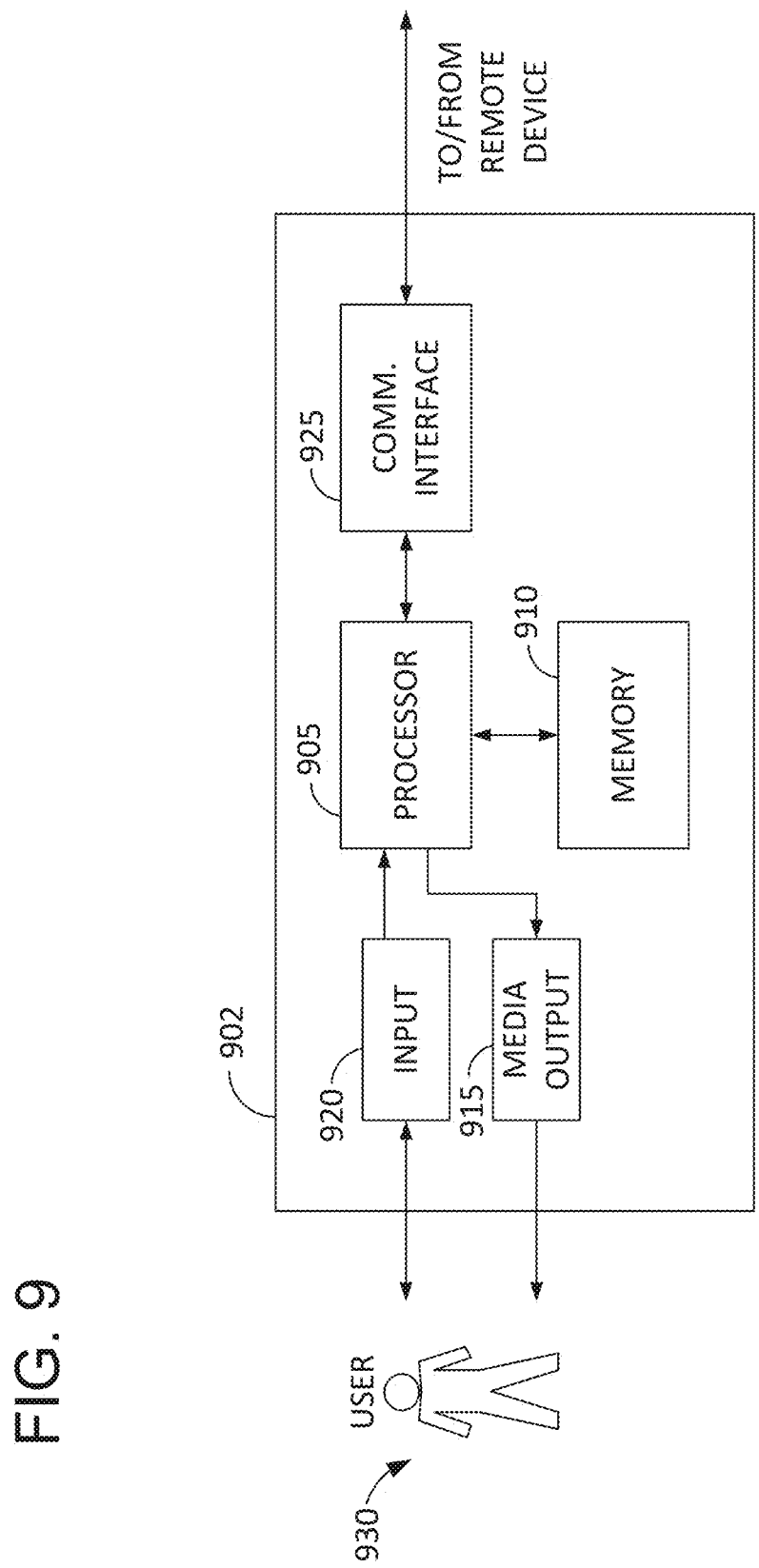
FIG. 9 illustrates an example configuration of the user computing device of the identity authority computing system shown in FIG. 1.

FIG. 9 depicts a user computing device 902 that may be used to implement user computing device 114 (shown in FIG. 1). Computing device 902 includes a processor 905 for executing instructions. In some embodiments, executable instructions are stored in a memory area 910. Processor 905 includes one or more processing units (e.g., in a multi-core configuration). Memory area 910 is any device allowing information such as executable instructions and/or other data to be stored and retrieved. Memory area 910 includes one or more computer-readable media. Further, computing device 902 may include a camera interface as described in FIG. 8.

Computing device 902 also includes at least one media output component 915 for presenting information to a user 930. Media output component 915 is any component capable of conveying information to user 930. In some embodiments, media output component 915 includes an output adapter, such as a video adapter and/or an audio adapter. An output adapter is operatively coupled to processor 905 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 915 is configured to present an interactive user interface (e.g., a web browser or client application) to user 930.

In some embodiments, computing device 902 includes an input device 920 for receiving input from user 930. Input device 920 includes, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 915 and input device 920.

Computing device 902 also includes a communication interface 925, which is communicatively coupleable to a remote device. Communication interface 925 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 910 are, for example, computer-readable instructions for providing a user interface to user 930 via media output component 915 and, optionally, receiving and processing input from input device 920. A user interface may include, among other possibilities, a web browser and a client application. Web browsers enable users 930 to display and interact with media and other information typically embedded on a web page or a website from a web server. A client application allows users 930 to interact with a server application associated with.

Figure 10:
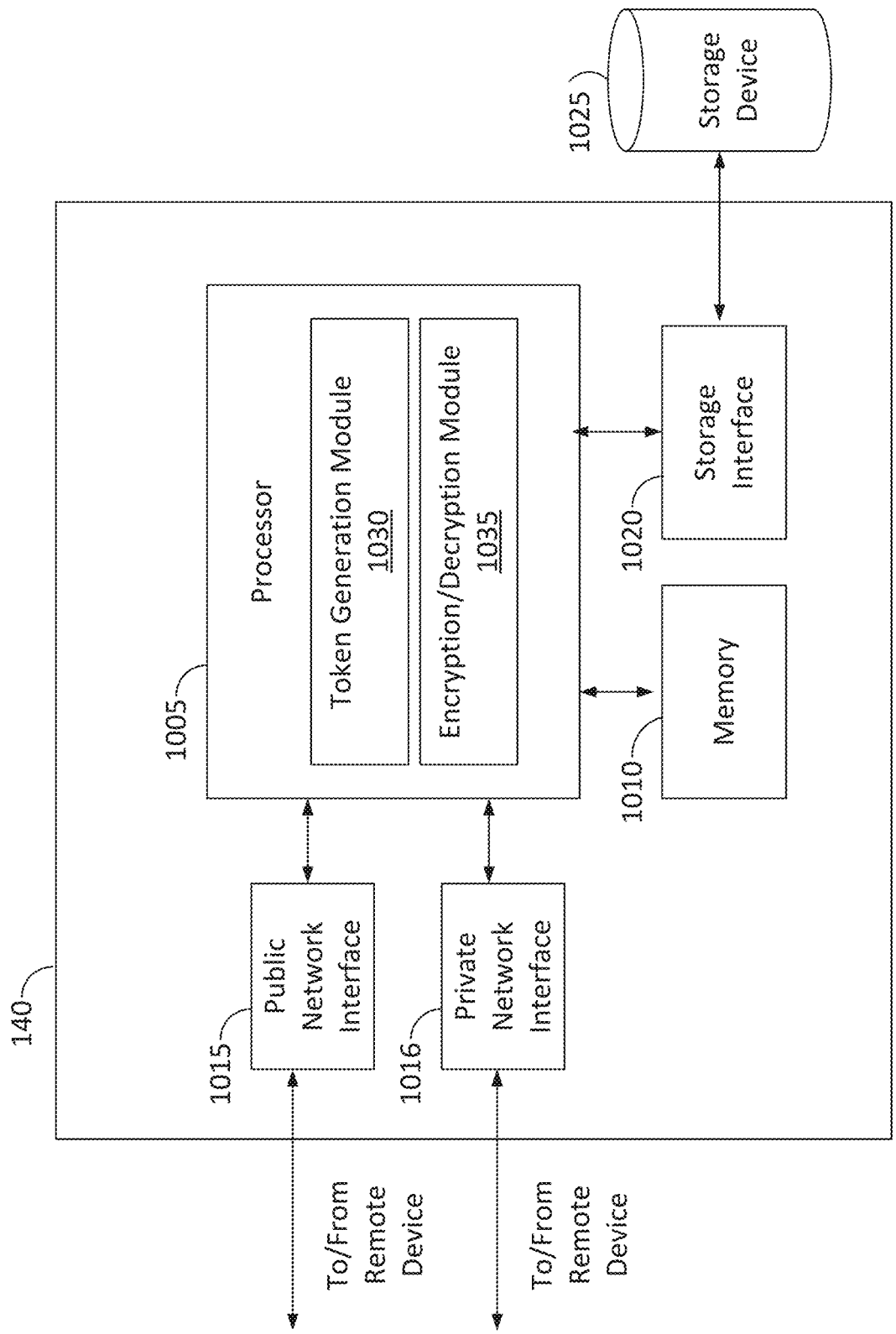
FIG. 10 illustrates an example configuration of the identity authority computing device of the identity authority computing system shown in FIG. 1.

FIG. 10 depicts an configuration of identity authority computing device 140. Identity authority computing device 140 includes a processor 1005 for executing instructions. Instructions are stored in a memory area 1010, for example. Processor 1005 includes one or more processing units (e.g., in a multi-core configuration).

In the example embodiment, processor 1005 is operable to execute token generation module 1030 and encryption/decryption module 1035. Modules 1030 and 1035 may include specialized instruction sets, coprocessors, and/or kernel extensions. Token generation module 1030 may generate secret values (e.g., activate tokens) based at least in part on a random number generator, as discussed above. Additionally, token generation module 1030 may verify token value 206 subsequently received from user computing device 114, as shown in FIG. 2. For example, token generation module 1030 may include a hardware random number generator.

Encryption/Decryption module 1035 is configured to encrypt and decrypt data based on public and/or private keys. For example, encryption/decryption module 1035 may be used to encrypt updated service request 308 as shown in FIG. 3. Further, encryption/decryption module 1035 may be used to decrypt service response 306, as shown in FIG. 3. In one embodiment, encryption/decryption module 1035 includes specialized processor instructions configured to encrypt/decrypt stored data (e.g., updated service request 308, service response 306). In another embodiment, encryption/decryption module 1035 may include an encryption/decryption optimized coprocessor connected to processor 1005.

Processor 1005 is operatively coupled to a first communication (i.e., network) interface 1015 and a second communication interface 1016. In some embodiments, first communication interface 1015 is configured to enable identity authority computing device 140 to communicate with remote device(s) such as user computing device 114 and interface computing device 112 over a public network, and second communication interface 1016 is configured to enable identity authority computing device 140 to communicate with remote device(s) such as service provider 154 over a private network, as described above (see, e.g., FIG. 4). In some embodiments, communication interface 1015 and/or communication interface 1016 is a virtual interface. In certain embodiments, each of communication interface 1015 and communication interface 1016 is associated with a respective network address, such as an IP ("internet protocol") address. In other embodiments, communication interface 1015 and/or communication interface 1016 are associated with physical network links. For example, communication interface 1015 may receive network packets from remote devices via Ethernet, using a switching device.

Processor 1005 is operatively coupled to a storage device 1025. Storage device 1025 is any computer-operated hardware suitable for storing and/or retrieving data, and, in the example embodiment, is used to implement identity database 156. In some embodiments, storage device 1025 is integrated in identity authority computing device 140. For example, identity authority computing device 140 may include one or more hard disk drives as storage device 1025. In other embodiments, storage device 1025 is external to identity authority computing device 140 and is accessed by a plurality of identity authority computing devices 140. For example, storage device 1025 may include multiple storage units such as hard disks or solid state disks in a redundant array of inexpensive disks (RAID) configuration. Storage device 1025 may include a storage area network (SAN) and/or a network attached storage (NAS) system.

In some embodiments, processor 1005 is operatively coupled to storage device 1025 via a storage interface 1020. Storage interface 1020 is any component capable of providing processor 1005 with access to storage device 1025. Storage interface 1020 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 905 with access to storage device 1025.

Memory areas 910 (shown in FIG. 9) and 1010 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 11:
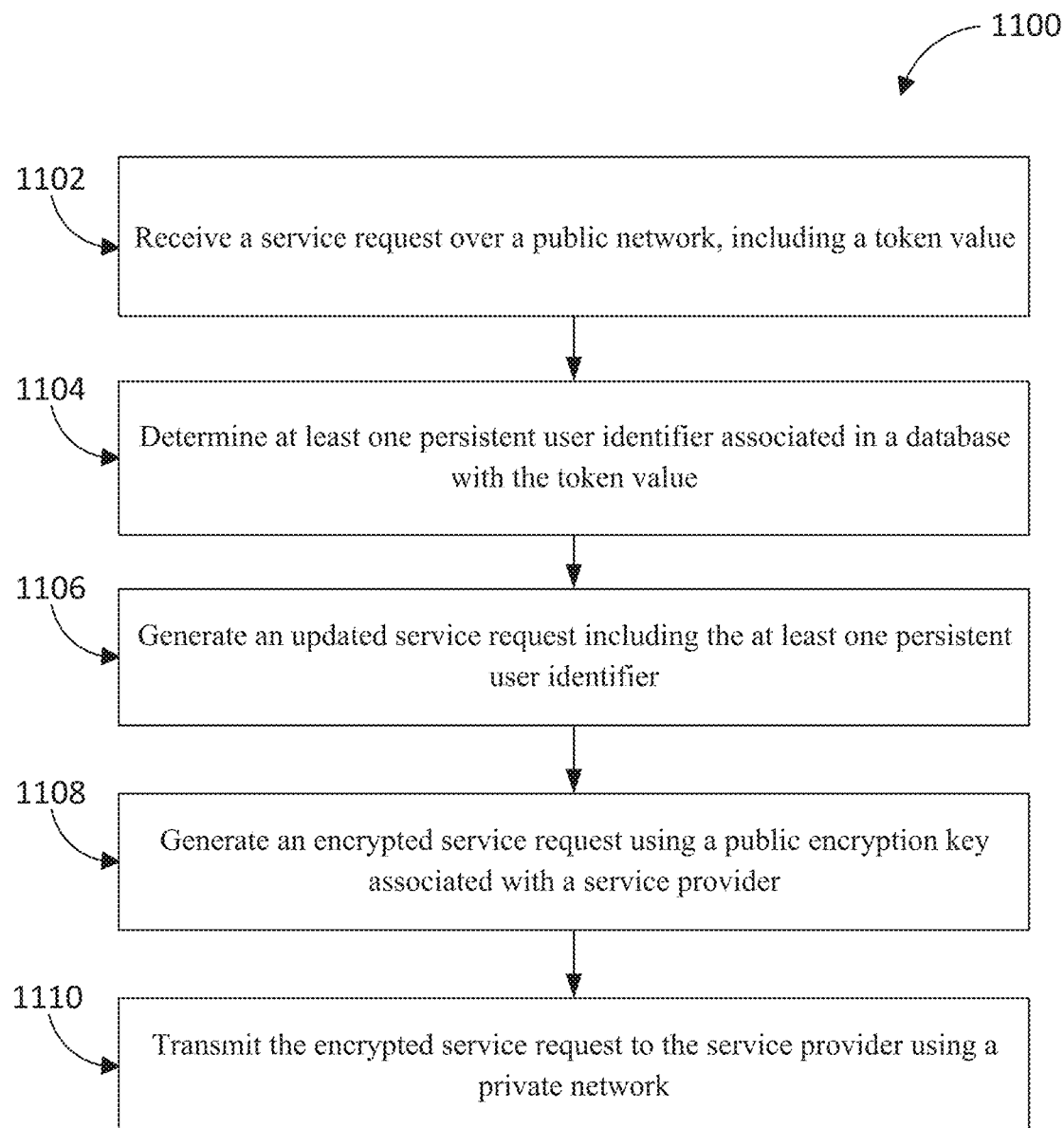
FIG. 11 is a flowchart illustrating an example method for securely transmitting user identifiers, using the identity authority system shown in FIG. 1.

FIG. 11 is a flowchart illustrating an example method for secure transmission of user identifiers. In the example embodiment, process 1100 is implemented on identity authority computing device 140 (shown in FIG. 1) in communication with identity database 156, the database storing a plurality of persistent user identifiers associated with a plurality of users. Process 1100 includes receiving 1102 a service request, such as service request 208 or 506, over a public network. The service request includes a service provider identifier and a single-use token value associated with one of the users. For example, the service provider identifier is associated with a service provider such as a credit history provider or a public records provider. Process 1100 further includes determining 1104 at least one persistent user identifier (e.g., social security number, driver's license number) associated in the database with the token value, and generating 1106 an updated service request, such as updated service request 308, including at least one persistent user identifier. For example, in the updated service request, the at least one persistent user identifier replaces the token value. Process 1100 further includes generating 1108 an encrypted service request using a public encryption key associated with the service provider identifier, and transmitting 1110 the encrypted service request to a service provider computing device associated with the service provider identifier. For example, the public encryption key may be retrieved based on the service identifier. Thus, the encrypted service request is configured such that it may be decrypted only by the service provider holding the complementary private key, such that the persistent user identifier is not transmitted in clear text.

As will be appreciated based on the foregoing specification, the above-described embodiments of the disclosure is implemented using computer programming or engineering techniques including computer software, firmware, hardware or any combination or subset thereof, wherein the technical effects described above are achieved. Any such resulting program, having computer-readable code means, is embodied or provided within one or more computer-readable media, thereby making a computer program product, (i.e., an article of manufacture), according to the discussed embodiments of the disclosure. The computer-readable media is, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code is made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An identity authority computing device comprising a processor programmed to:

communicate with a public network and with a secure data processing domain, and prevent access from the public network to confidential user data stored in the secure data processing domain;

receive a service request over the public network from an interface domain that includes an interface computing device in communication with a user computing device, the service request including a service provider identifier and a single-use token value associated with a user;

in response to the service request, access an identity database within the secure data processing domain, wherein the identity database stores and indexes confidential information for a plurality of users including a plurality of persistent user identifiers;
retrieve, from the identity database, at least one persistent user identifier associated in the identity database with the token value;
generate an updated service request including the at least one persistent user identifier;
generate an encrypted service request by using a public encryption key associated with the service provider identifier to encrypt the updated service request; and
transmit, within the secure data processing domain, the encrypted service request to a service provider computing device associated with the service provider identifier,
wherein the interface domain is prevented from accessing confidential user data associated with the user including the persistent user identifier of the user.

2. The identity authority computing device of claim 1, wherein the processor is further programmed to:
receive a service response from the service provider computing device, the service response including response data and the at least one persistent user identifier;
filter the at least one persistent user identifier from the service response; and
transmit the filtered service response and the token value to the interface computing device.

3. The identity authority computing device of claim 2, wherein the service response includes at least one of credit history data, personal background data, and vehicle insurance data.

4. The identity authority computing device of claim 1, wherein the service request is received from a user computing device in temporary local data communication with the interface computing device.

5. The identity authority computing device of claim 1, wherein the service request is received from the interface computing device in response to receipt by the interface computing device of the token value from a user computing device.

6. The identity authority computing device of claim 1, wherein the token value is a one-time password generated by a user computing device based on a token secret generated by the identity authority computing device.

7. The identity authority computing device of claim 1, wherein the at least one persistent user identifier is at least one of a social security number and a driver's license number.

8. A computer-implemented method for secure transmission of user identifiers, said method implemented using an identity authority computing device including a processor, said method comprising:
communicating with a public network and with a secure data processing domain, and preventing access from the public network to confidential user data stored in the secure data processing domain;
receiving a service request over the public network from an interface domain that includes an interface computing device in communication with a user computing device, the service request including a service provider identifier and a single-use token value associated with a user;
in response to the service request, accessing an identity database within the secure data processing domain, wherein the identity database stores and indexes confidential information for a plurality of users including a plurality of persistent user identifiers;
retrieving, from the identity database, at least one persistent user identifier associated in the identity database with the token value;
generating an updated service request including the at least one persistent user identifier;
generating an encrypted service request by using a public encryption key associated with the service provider identifier to encrypt the updated service request; and
transmitting, within the secure data processing domain, the encrypted service request to a service provider computing device associated with the service provider identifier,
wherein the interface domain is prevented from accessing confidential user data associated with the user including the persistent user identifier of the user.

9. The computer-implemented method of claim 8, further comprising:
receiving a service response from the service provider, the service response including response data and the at least one persistent user identifier;
filtering the at least one persistent user identifier from the service response computing device; and
transmitting the filtered service response and the token value to the interface computing device.

10. The computer-implemented method of claim 9, wherein the service response includes at least one of credit history data, personal background data, and vehicle insurance data.

11. The computer-implemented method of claim 8, wherein the service request is received from a user computing device in temporary local data communication with the interface computing device.

12. The computer-implemented method of claim 8, wherein the service request is received from the interface computing device in response to receipt by the interface computing device of the token value from a user computing device.

13. The computer-implemented method of claim 8, wherein the token value is a one-time password generated by a user computing device based on a token secret generated by the identity authority computing device.

14. The computer-implemented method of claim 8, wherein the at least one persistent user identifier is at least one of a social security number and a driver's license number.

15. A non-transitory computer readable storage media having computer-executable instructions embodied thereon, wherein when executed by an identity authority computing device having a processor, the computer-executable instructions cause the processor to:
communicate with a public network and with a secure data processing domain, and prevent access from the public network to confidential user data stored in the secure data processing domain;
receive a service request over the public network from an interface domain that includes an interface computing device in communication with a user computing device, the service request including a single-use token value associated with a user and a service provider identifier;
in response to the service request, access an identity database within the secure data processing domain, wherein the identity database stores and indexes confidential information for a plurality of users including a plurality of persistent user identifiers;

retrieve, from the identity database, at least one persistent user identifier associated in the identity database with the token value;

generate an updated service request including the at least one persistent user identifier;

generate an encrypted service request by using a public encryption key associated with the service provider identifier to encrypt the updated service request; and transmit, within the secure data processing domain, the encrypted service request to a service provider computing device associated with the service provider identifier, wherein the interface domain is prevented from accessing confidential user data associated with the user including the persistent user identifier of the user.

16. The non-transitory computer readable storage media of claim 15, wherein the computer-executable instructions further cause the processor to:

receive a service response from the service provider computing device, the service response including response data and the at least one persistent user identifier;

filter the at least one persistent user identifier from the service response; and transmit the filtered service response and the token value to the interface computing device.

17. The non-transitory computer readable storage media of claim 16, wherein the service response includes at least one of credit history data, personal background data, and vehicle insurance data.

18. The non-transitory computer readable storage media of claim 15, wherein the service request is received from a user computing device in temporary local data communication with the interface computing device.

19. The non-transitory computer readable storage media of claim 15, wherein the service request is received from the interface computing device in response to receipt by the interface computing device of the token value from a user computing device.

20. The non-transitory computer readable storage media of claim 15, wherein the token value is a one-time password generated by a user computing device based on a token secret generated by the identity authority computing device.

* * * * *